(12) United States Patent
Palliser

(10) Patent No.: US 6,631,865 B2
(45) Date of Patent: Oct. 14, 2003

(54) SEAT BELT RETRACTOR

(75) Inventor: Martyn Palliser, Cumbria (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 92 days.

(21) Appl. No.: 10/001,303

(22) Filed: Nov. 1, 2001

(65) Prior Publication Data

US 2003/0015616 A1 Jan. 23, 2003

(30) Foreign Application Priority Data

Jul. 18, 2001 (EP) .................................. 01306175

(51) Int. Cl.[7] ................................................ B60R 22/38
(52) U.S. Cl. ................................................. 242/382.2
(58) Field of Search ........................ 242/382.2, 382.4, 242/384.5; 280/806; 297/478

(56) References Cited

U.S. PATENT DOCUMENTS

| | | | | |
|---|---|---|---|---|
| 4,566,649 A | * | 1/1986 | Petersen, III | 242/382.2 |
| 4,749,143 A | * | 6/1988 | Tsukamoto et al. | 242/382.2 |
| 4,817,885 A | * | 4/1989 | Matsumoto | 242/382.2 |
| 4,948,066 A | * | 8/1990 | Matsumoto et al. | 242/382.2 |
| 5,257,754 A | * | 11/1993 | Hishon | 242/382.2 |
| 5,367,917 A | * | 11/1994 | Hishon et al. | 242/382.4 |
| 5,505,400 A | * | 4/1996 | Boelstler et al. | 242/382.2 |
| 5,831,342 A | * | 11/1998 | Vivacqua et al. | |
| 5,934,596 A | * | 8/1999 | Gorman et al. | 242/382.2 |
| 6,109,556 A | * | 8/2000 | Kopetzky et al. | 242/382.2 |

FOREIGN PATENT DOCUMENTS

| | | | |
|---|---|---|---|
| JP | 406285680 A | * | 10/1994 |
| WO | WO 01/30614 | * | 5/2001 |

* cited by examiner

*Primary Examiner*—William A. Rivera
(74) *Attorney, Agent, or Firm*—Lonnie R. Drayer

(57) ABSTRACT

A seat belt retractor operates in two distinct modes: a first, Emergency Locking Retractor (ELR), mode; and a second, Automatic Locking Retractor (ALR), mode. A toothed ratchet wheel is mounted to rotate with a spool that is biased in a seat belt webbing rewinding direction. A sensor detects an emergency condition of the vehicle. A vehicle acceleration sensor lever responsive to the sensor engages the ratchet wheel in the event of an emergency condition. The vehicle acceleration sensor lever performs two functions: it locks the retractor when the sensor detects accelerations and decelerations greater than a predetermined magnitude and it also prevents rotation of the spool in the seat belt webbing pay-out direction when operating in its second mode. A cam connected to the spool via a step-down gearing arrangement acts as a switch.

18 Claims, 6 Drawing Sheets

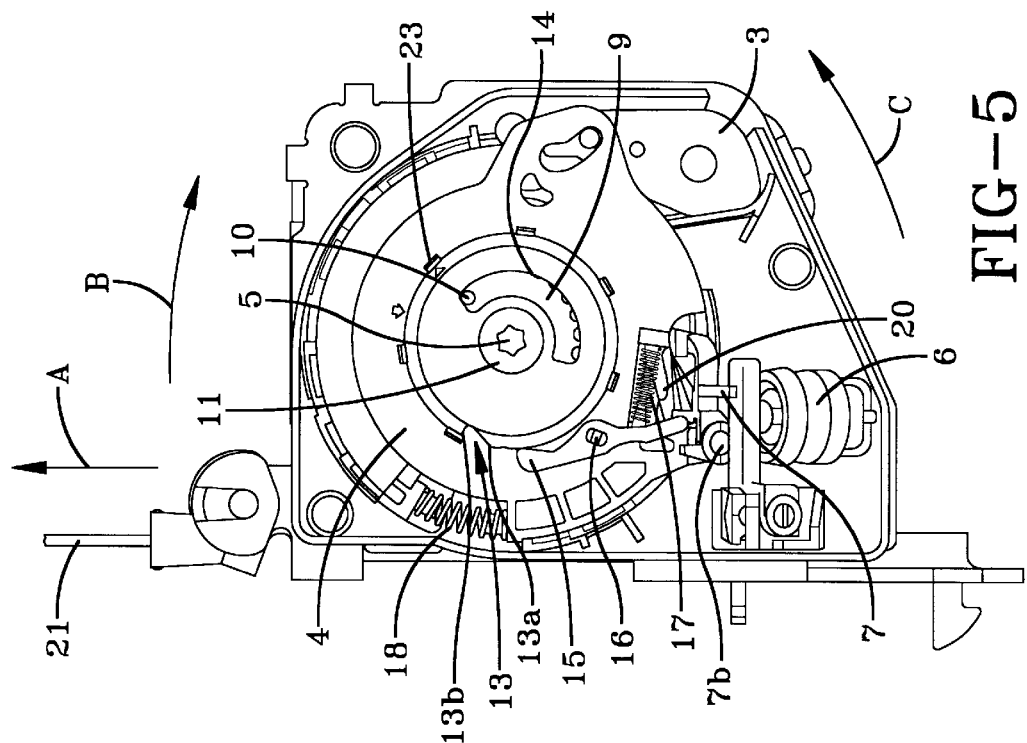
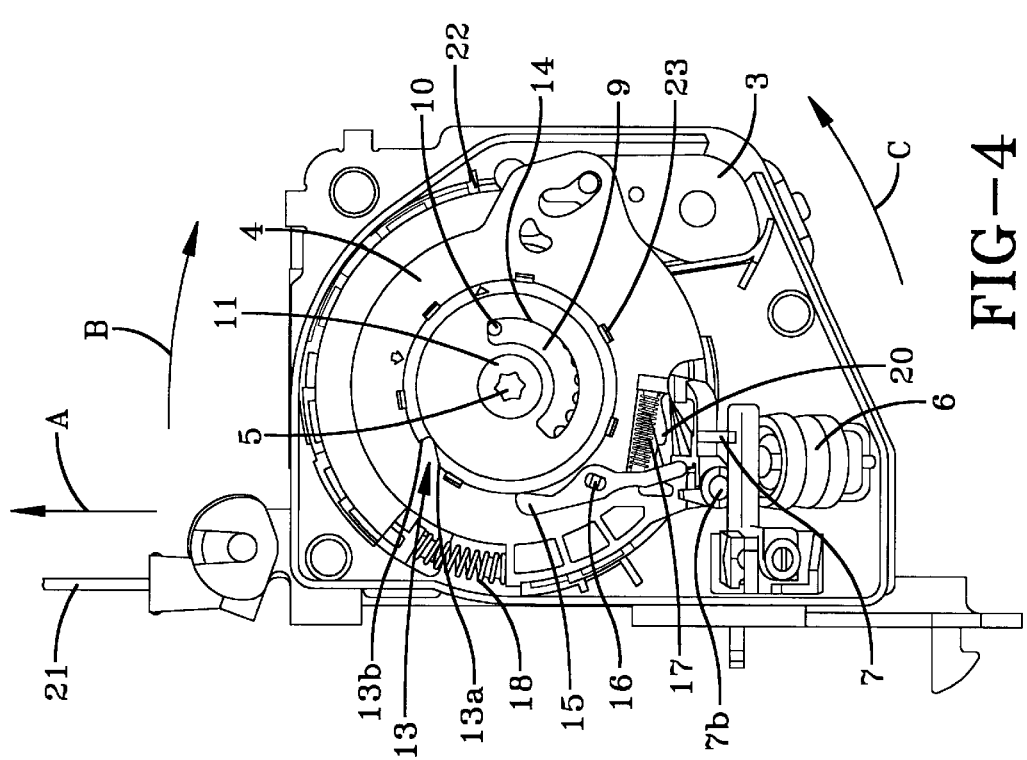

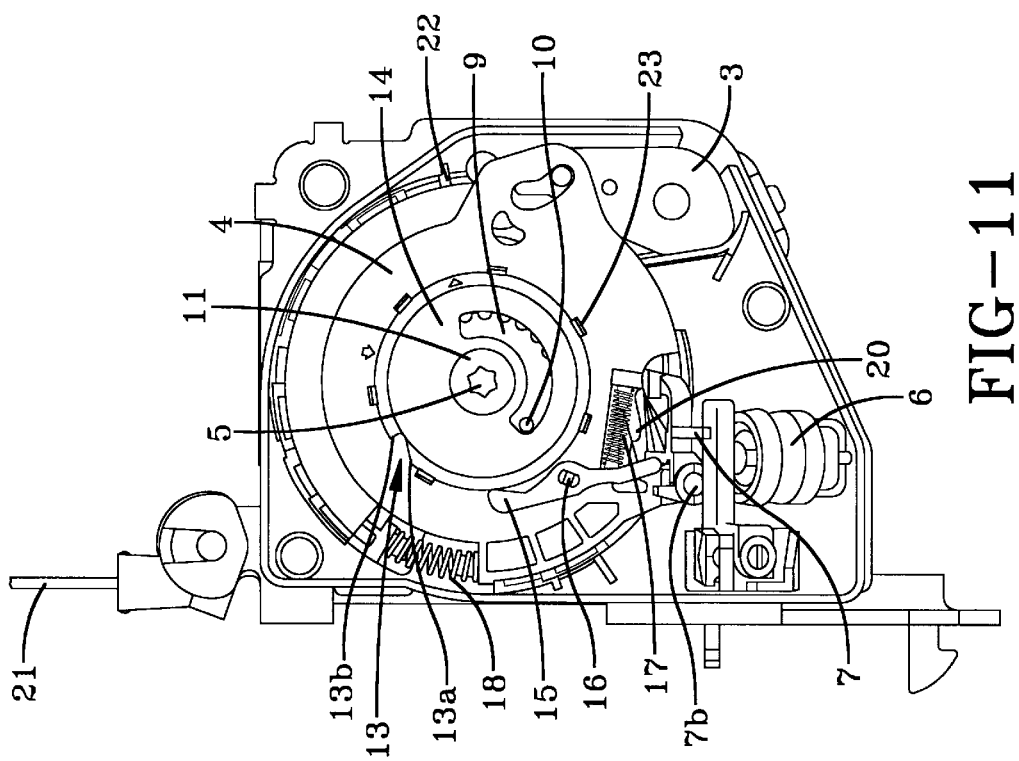
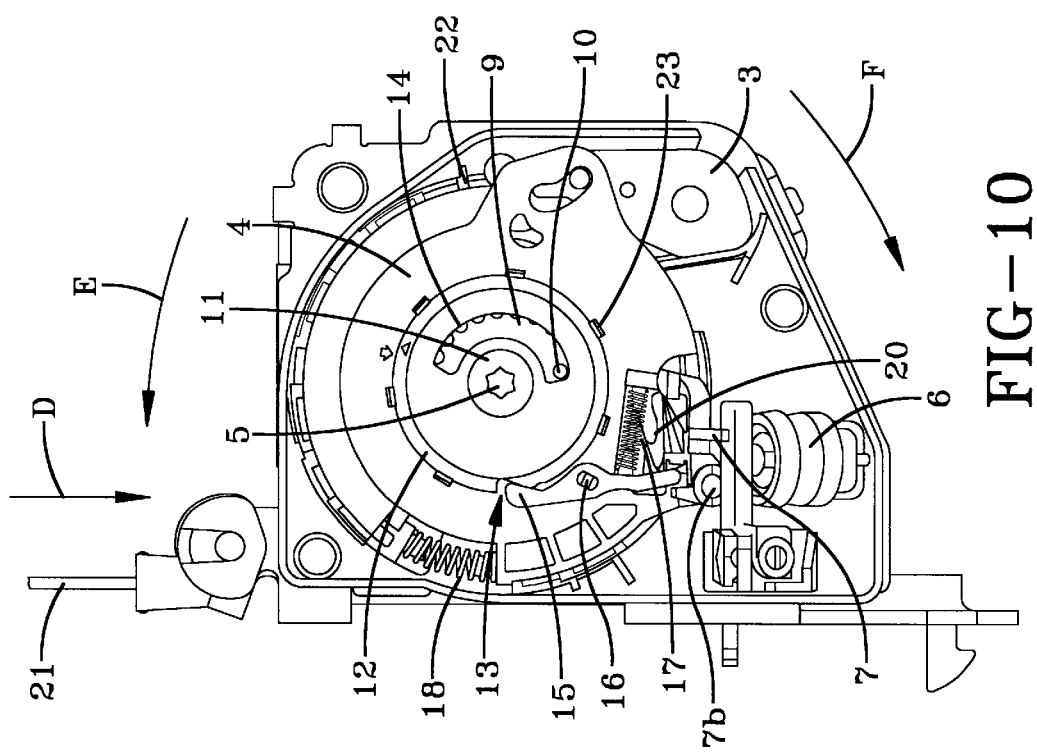

SEAT BELT RETRACTOR

FIELD OF THE INVENTION

The current invention relates to seat belt retractors.

BACKGROUND OF THE INVENTION

A conventional seat belt retractor allows a vehicle occupant some freedom of movement, but has a sensor to detect acceleration above a predetermined magnitude indicative of an emergency situation. The seat belt retractor then locks, arresting the vehicle occupant's movement. This can also occur when the vehicle occupant leans forward too quickly to reach a control on the instrument panel. Seat belts which allow movement are desirable for adult vehicle occupants as they restrain passengers in emergency situations but are comfortable because they allow a reasonable degree of freedom for movement during normal driving conditions. When transporting a young child with a child seat the child seat must be fixed in place, but it is desirable for the same seat belt retractor to also operate as a normal inertial retractor to provide the expected comfort for an adult.

This problem is a well known and several solutions have been proposed. U.S. Pat. No. 6,109,556 teaches a seat belt arrangement for motor vehicles, specially adapted for use with a child seat to switch between a fixed mode for the child seat and an automatic mode for adults. Such a seat belt retractor is known as a Child Hold Out Mechanism, sometimes referred to as a "CHOM".

U.S. Pat. No. 6,109,556 teaches a retractor switching means comprising a cam connected to a spool via a step down gearing arrangement and a cam follower. The step down gearing arrangement comprises an inner gear ring and a gear arrangement with a drive peg located at a predetermined radius. The drive peg is arranged to move cycloidally and rotate the cam when the gear rotates. This cycloidal motion often results in the gear arrangement being known as a "wobble" gear. The cam follower is pivotally mounted and arranged to be in continuous contact with the cam surface. At a predetermined rotational orientation of the cam, the cam follower urges the sensor lever into engagement with a toothed ratchet wheel fixed to the spool to lock the spool and seat belt webbing protraction.

A particular problem with Child Hold Out Mechanism retractors is that a large number of components are needed and this increases the size of the retractor.

SUMMARY OF THE INVENTION

There is provided in accordance with the present invention a seat belt retractor comprising a spool for carrying seat belt webbing rotatably mounted about a longitudinal axis and biased in a seat belt webbing rewinding direction, a toothed ratchet wheel mounted to rotate with the spool, a sensor for detecting an emergency condition, a vehicle acceleration sensor lever responsive to the sensor to engage the ratchet wheel in the event of an emergency condition, means for locking the spool against pay-out of seat belt webbing in response to the vehicle acceleration sensor lever engaging the ratchet wheel, the retractor being adapted to operate in a first, emergency locking mode in which the spool is not locked and can rotate to pay-out and to rewind seat belt webbing. In a second, automatic locking mode in which the spool is locked against pay-out of the seat belt webbing and means for switching between the first mode and the second mode, wherein, the switching means comprises a cam connected to the spool via a step-down gearing arrangement and having a cam surface and an actuating lever having a cam follower resiliently biased against the cam surface, the actuating lever being pivotally mounted and moveable from a first position in which it does not actuate the vehicle acceleration sensor lever and the retractor is in the first mode against the action of the resilient bias to a second position in which it actuates the vehicle acceleration sensor lever and the retractor is in the second mode.

BRIEF DESCRIPTION OF THE DRAWINGS

FIGS. 3 to 6 are side elevations of the seat belt retractor of FIGS. 1 and 2 in a first mode of operation at various stages of seat belt webbing withdrawal.

FIGS. 7, 9 and 10 are side elevations of the seat belt retractor of FIGS. 1 and 2 in a second mode of operation at various stages of seat belt webbing withdrawal.

FIG. 11 is a side elevation of the seat belt retractor of FIGS. 1 and 2 returned to the first mode of operation.

DETAILED DESCRIPTION OF THE INVENTION

Figure 1:
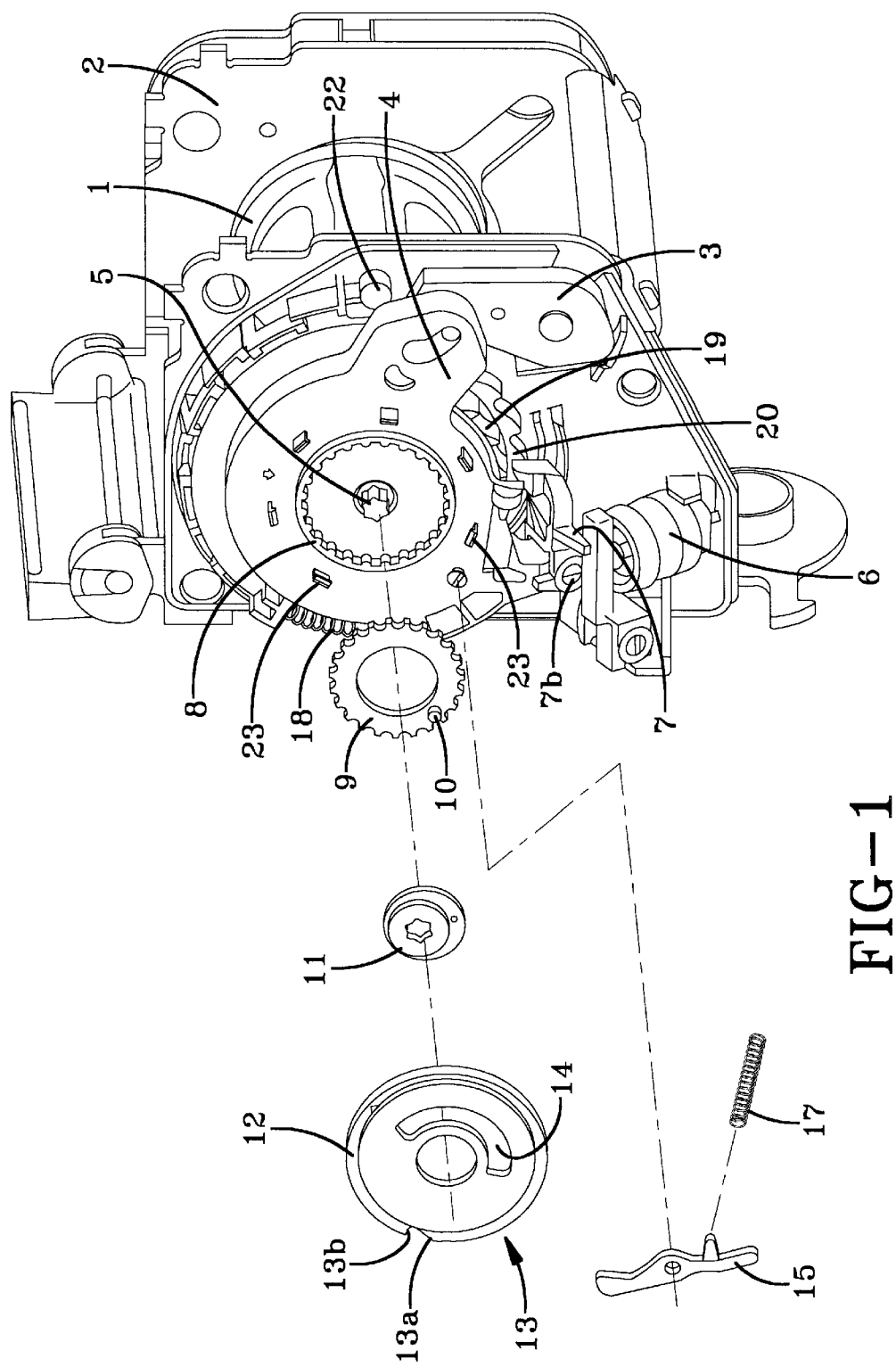
FIG. 1 is a partially exploded perspective view of a seat belt retractor according to the invention.
Figure 2:
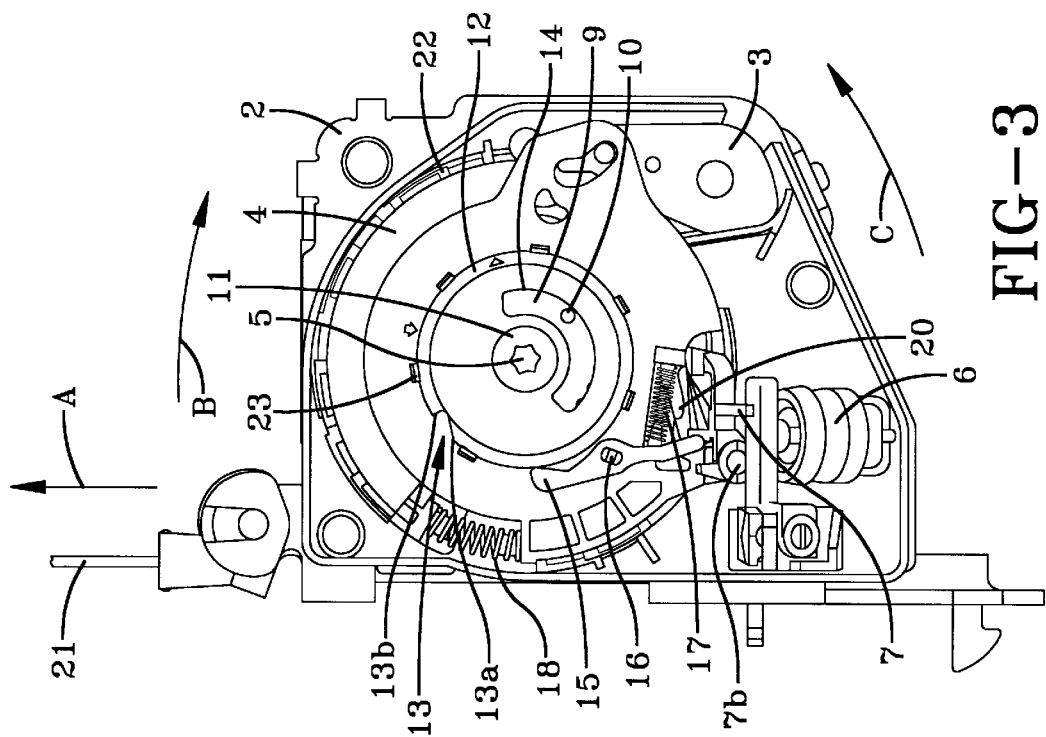
FIG. 2 is a partially cut away side elevation of the seat belt retractor of FIG. 1 with a part removed to more clearly show other components.

In FIG. 1, a vehicle seat belt retractor is shown with the seat belt webbing substantially fully protracted from a spool 1 mounted in a frame 2. Thus the individual parts of the mechanism can be more clearly seen. Like reference signs are used throughout the figures. The seat belt retractor comprises a lock bar 3, a pivotable mounting member 4, an eccentric cam drive 5, a vehicle acceleration sensor 6, a vehicle acceleration sensor lever 7 pivotable about a pivot point 7b, an inner gear ring 8, a wobble gear arrangement 9, a pin 10, an eccentric cam 11, an actuation cam 12 with a cam surface having an indentation 13 therein comprising a ramp 13a and a step 13b that is substantially radial to the cam surface for engaging an actuation lever 15, a window 14, an actuation lever pivot 16, an actuation lever spring 17, a mounting member spring 18, a ratchet wheel 19, a lock gear 20, a fixed mounting member 22 and mounting lugs 23. The actuation lever 15 has a relatively smaller contact area with the cam surface of the actuation cam 12 when not in engagement with the indentation 13 in the cam surface than when in engagement with the indentation in the cam surface.

The seat belt retractor of the figures operates in two distinct modes: a first, Emergency Locking Retractor (ELR), mode; and a second, Automatic Locking Retractor (ALR), mode. In ELR mode, seat belt webbing 21 can be wound onto the spool 1 and pulled from the spool 1. This allows the vehicle occupant to move freely to, for example, adjust a radio or a control on a vehicle instrument panel. Sudden movements however, which have an acceleration greater than a predetermined magnitude, for example caused by a sharp vehicle deceleration, cause the seat belt retractor to lock. This prevents further payout of the seat belt webbing 21 and restrains the vehicle occupant. Most vehicle occupants use the seat belt retractor in ELR mode.

In ALR mode, seat belt webbing 21 can be retracted on to the spool 1 but not pulled from the spool 1. This mode is used when restraining a child seat in a vehicle.

To switch to ALR mode, a predetermined amount of seat belt webbing 21 is pulled from the spool 1. This activates a mechanism that locks the spool 1 against further payout of seat belt webbing 21.

Usually this switching occurs when substantially the whole of the seat belt webbing 21 is retracted, for example, is wound on the spool 1. The spool 1 is biased in the retraction direction of the seat belt webbing 21.

FIG. 1 is a partially exploded view of the seat belt retractor shown without seat belt webbing 21. This clearly shows the inner gear ring 8, the eccentric cam drive 5, the wobble gear 9, the pin 10, located on the wobble gear 9, the eccentric cam 11, the actuation cam 12 with the window 14 cut through the actuation cam 12 and the actuation lever 15.

The window 14 comprises a concentric arcuate slot cut through the face of the actuation cam 12 and having an inner wall and an outer wall at respective predetermined radii from the center of the cam and each having a predetermined arcuate length. In the particular embodiment shown, the arcuate slot extends through an angle of just less than 180 degrees.

The pin 10 is located at a predetermined radius on the wobble gear 9. The position of the pin 10 within the window 14 is determined by the amount of seat belt webbing 21 that has been pulled from the spool 1.

The actuation lever 15 is pivotally attached to the pivotable mounting member 4 at the pivot point 16. One portion of the actuation lever 15 is biased towards the cam surface of actuation cam 12 by the actuation lever spring 17. In the embodiment shown, in the actuation lever spring 17 is a helical spring in compression and causes the actuation lever 15 to remain in contact with the cam surface of the actuation cam 12 irrespective of the rotational orientation of the actuation cam 12.

A mounting member 22 is fixedly attached to a frame 2. The fixed mounting member 22 can be made of a plastic material and the frame 2 can be made of metal.

The vehicle acceleration sensor lever 7 is pivotally mounted to the pivotable mounting member 4 at a pivot point 7b. The vehicle acceleration sensor 6 is a standing man sensor, well known in the art, that is mounted on the pivotable mounting member 4 to detect vehicle accelerations and decelerations above a predetermined magnitude and upon detection of said accelerations/decelerations to bias the vehicle acceleration sensor lever against at least one tooth on the ratchet wheel. The vehicle acceleration sensor 6 may take other forms. The internal gear ring 8 is fixedly mounted to the pivotable mounting member 4. In one embodiment, the step-down gearing is a cycloidal gear system commonly known as a wobble gear. However, other step-down gearing can be used. Preferably, the step-down gearing is a cycloidal system comprising an eccentric cam. The eccentric cam drive 5, the eccentric cam 11, the wobble gear 9 and the actuation cam 12 can all move relative to the pivotable mounting member 4.

Figure 8:
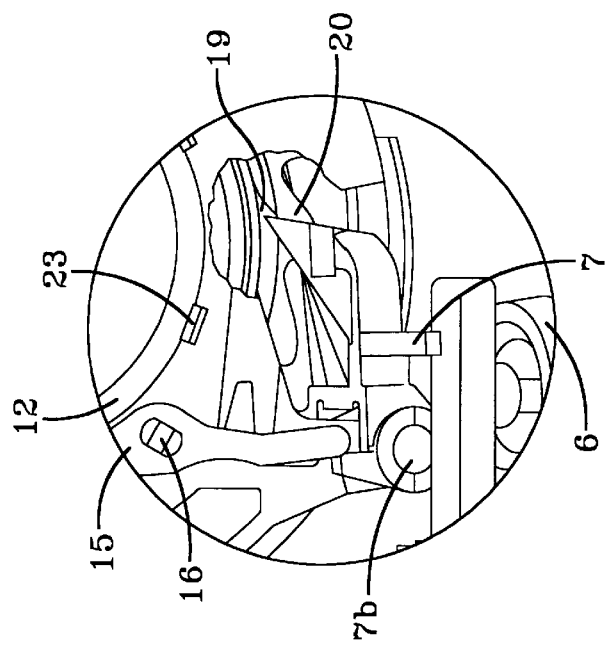
FIG. 8 is an enlarged view of part of the seat belt retractor of FIG. 7.

Fixedly mounted to the eccentric cam drive 5 is a ratchet wheel 19 and a lock gear 20, as shown in FIG. 8. The vehicle acceleration sensor 6 detects accelerations/decelerations above a predetermined magnitude. When accelerations/decelerations are below the predetermined magnitude, the vehicle acceleration sensor lever 7, pivotable about a pivot point 7b is not engaged with the ratchet wheel 19. This allows rotation of the spool 1 and hence the eccentric cam 5, ratchet wheel 19 and lock gear 20, in both seat belt webbing 21 extraction and retraction directions. When the vehicle acceleration sensor 6 detects accelerations/decelerations above a predetermined magnitude, the vehicle acceleration sensor lever 7 pivots about the pivot point 7b and engages with at least one tooth on the ratchet wheel 19. Preferably, the vehicle acceleration sensor lever is the only lever arranged to engage the ratchet wheel. This allows a relatively substantial reduction in size over known seat belt retractors of this type that use additional levers to engage the ratchet. One portion of the vehicle acceleration sensor lever is arranged to co-operate with the sensor and another portion is arranged for engagement with the ratchet wheel and wherein the pivot point of the vehicle acceleration sensor lever is located between each of said portions. Any further rotation of the spool 1, and hence the eccentric cam drive 5, the ratchet wheel 19 and the lock gear 20, in the direction of seat belt webbing 21 pay-out, is communicated by the vehicle acceleration sensor lever 7 to the pivotable mounting member 4 causing it to rotate in the same direction as the spool 1, compressing the mounting member spring 18 and causing the lock bar 3, which is pivotally mounted on the frame 2 to engage with the lock gear 20 fully arresting the rotation of the spool. This happens during vehicle crashes and when a vehicle occupant pulls too sharply on the seat belt webbing 21.

FIGS. 3 to 11 illustrate the operation of the seat belt retractor as it switches from ELR mode, as shown in FIGS. 3 to 6, into ALR mode, as shown in FIGS. 7 to 10, and back to ELR mode, as shown in FIG. 11.

Figure 3:
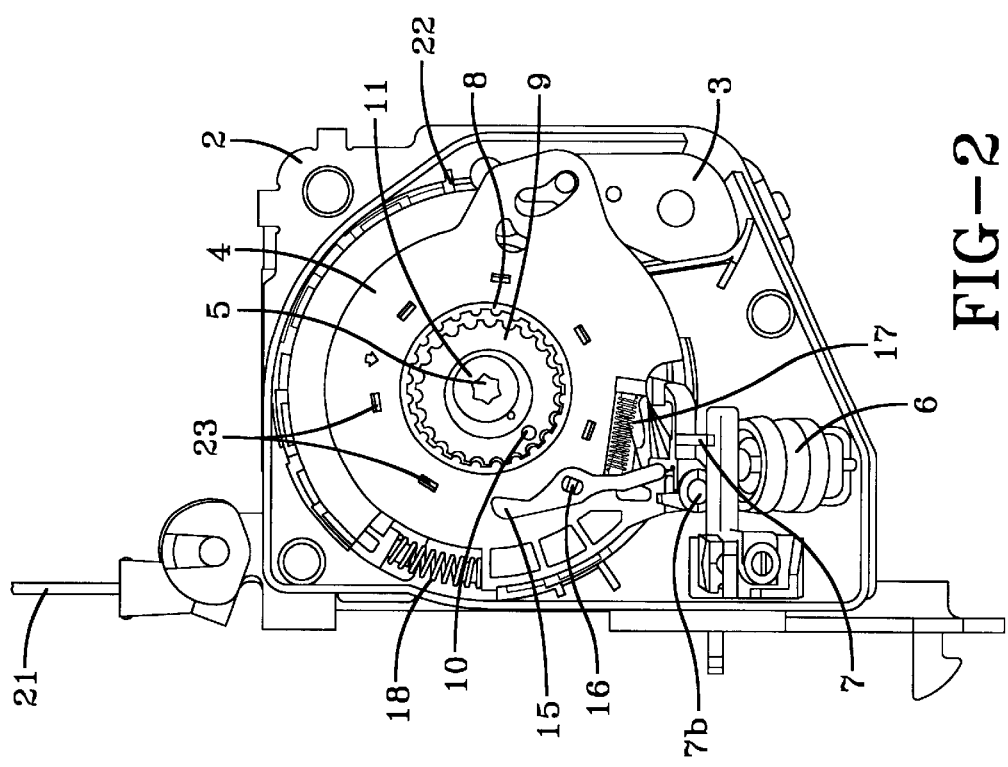

FIG. 3 shows seat belt webbing 21 being pulled from the spool 1 upwards, in the direction of the arrow A. The spool 1, eccentric cam drive 5 and eccentric cam 11 are shown rotating in the direction of the arrow B (clockwise). The wobble gear 9 is rotating anti-clockwise as shown by arrow C, in the opposite direction to the spool 1. The actuation cam 12, is stationary because a protrusion 10 on the wobble gear 9 is moving through the window 14 and is not in contact with either end of window. The actuation cam 12 only rotates when the pin 10 is abutting one end of the window 14 and the wobble gear 9 is rotating: there is no contact between the actuation lever 15 and the vehicle acceleration sensor lever 7 nor between the vehicle acceleration sensor 7 and the ratchet wheel 19. The vehicle acceleration sensor 7 is free to move about a pivot point 7b and the ratchet wheel 19 rotates clockwise in the same direction as the spool 1 as shown by arrow B. The actuation lever 15 is in contact with the cam surface of the actuation cam 12 but is not in engagement with the indentation 13.

In FIG. 4, the seat belt webbing has been protracted and the pin 10 has just come into contact with the end of window 14. The actuation cam 12 has not yet begun to rotate.

FIG. 5 shows the seat belt retractor slightly later when the actuation cam 12 is also rotating in an anti-clockwise direction and is being driven by a pin 10. One portion of the actuation lever 15 is in contact with the cam surface of the actuation cam 12. The actuation lever 15 is not yet engaged with the indentation 13 and there is no contact between the actuation lever 15 and the vehicle acceleration sensor lever 7 or between the vehicle acceleration sensor lever 7 and the ratchet wheel 19.

Figure 6:
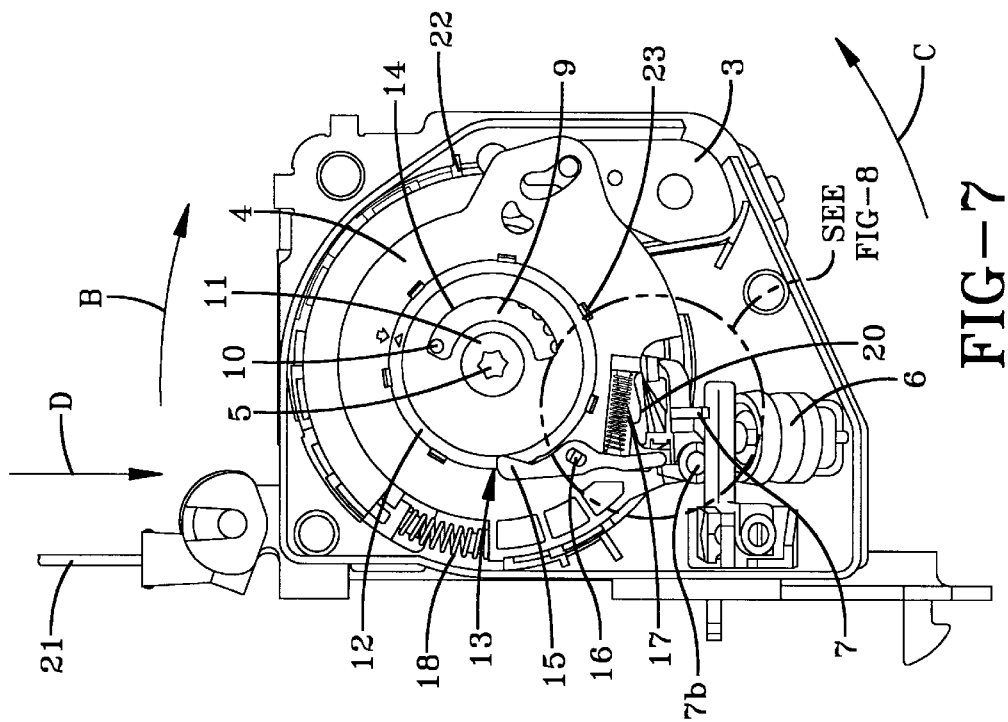

FIG. 6 shows the seat belt retractor in a condition where a portion of the actuation lever 15 has moved partway down a ramp 13a. The distance between the actuation lever 15 and the vehicle acceleration sensor lever 7 has reduced but there is no contact between them. The vehicle acceleration sensor lever 7 can move freely about a pivot point 7b when the retractor is functioning in the first mode of operation.

Figure 7:
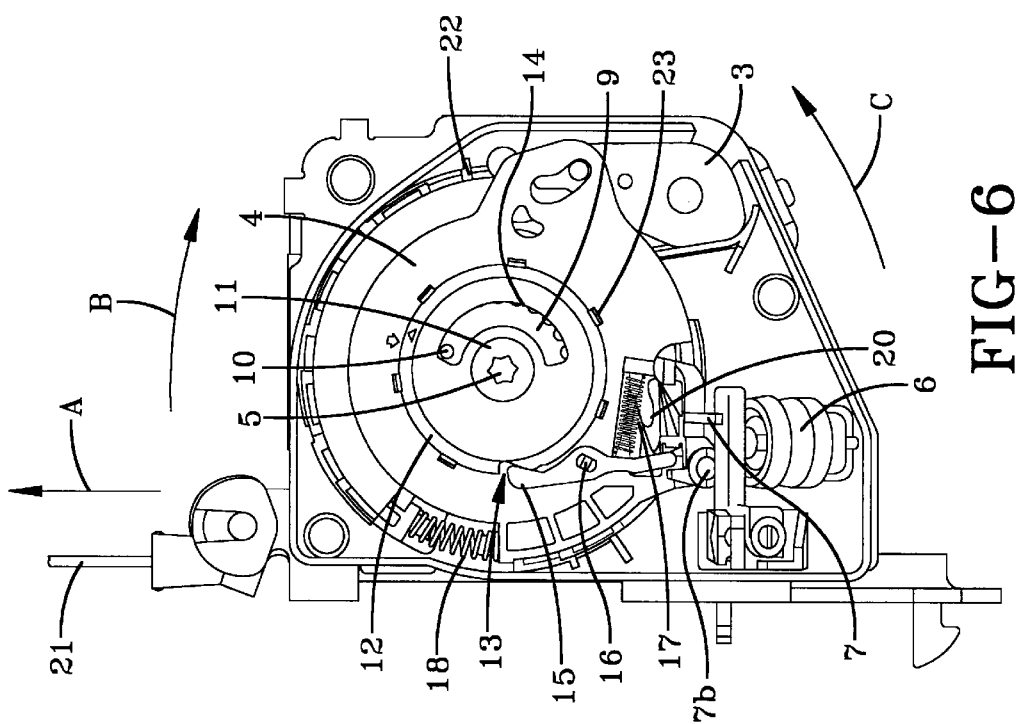

FIG. 7 shows the upper end of the actuation lever 15 fully engaged with indentation 13 on the cam surface of the actuation cam 12 and abutting a step 13b. The lower end of the actuation lever 15 contacts the vehicle acceleration sensor lever 7 and biases it into engagement with at least one tooth on the ratchet wheel 19. This couples the pivotable mounting member 4 with the spool 1. Further seat belt webbing 21 pay-out from the spool is prevented because the pivotable mounting member 4 rotates a few degrees in the seat belt webbing pay-out direction and urges the lock bar 3 into engagement with the lock gear 20 fully arresting the spool 1 rotation. The retractor has switched from ELR mode to ALR mode and there is almost no seat belt webbing left on the spool 1. At this point, seat belt webbing can only be put back onto the spool 1, as indicated by the arrow D. From this point onward the spool and eccentric cam can only rotate anti-clockwise, as indicated by arrow E in FIGS. 9 and 10 and the gearwheel can only rotate clockwise as indicated by arrow F in FIGS. 9 and 10. Preferably, the amount of seat belt webbing which must be pulled from the spool to switch the seat belt retractor from the first mode of operation to the second mode of operation is substantially the full amount of seat belt webbing and the amount of seat belt webbing that must be retracted onto the spool to switch the seat belt retractor from the second mode of operation to the first mode of operation is substantially the full amount of seat belt webbing.

FIG. 8 is an enlarged view of the sensor mechanism of the seat belt retractor which more clearly shows the relative positions of the vehicle acceleration sensor lever 7, the actuation lever 15 and the vehicle acceleration sensor lever 7 to the ratchet wheel 19 when functioning in Automatic Locking Retractor (ALR) mode. The actuation lever 15 is in contact with the vehicle acceleration sensor level 7 that is therefore biased towards the ratchet wheel 19 and fully engaged with a tooth on the ratchet wheel 19.

Figure 9:
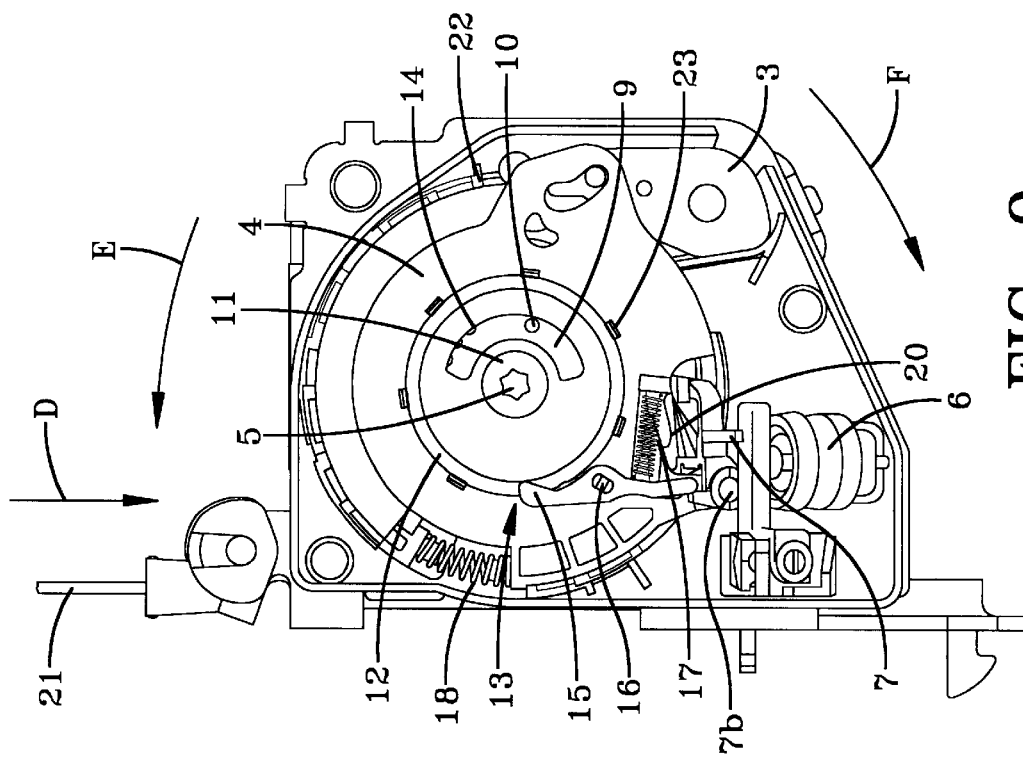

FIG. 9 shows the ALR mode with seat belt webbing 21 being pulled back on to spool 1 in the direction of the arrow D, that is to say the spool 1 is biased in this direction of winding seat belt webbing 21 on to spool 1.

FIG. 10 shows the condition when the seat belt retractor is switching from ALR mode back to ELR mode. Seat belt webbing is being wound onto the spool, and it cannot be pulled off the spool because the vehicle acceleration sensor lever 7 is still engaged. The spool 1 and the eccentric cam 5 therefore only rotate anti-clockwise and the wobble gear 9 and the actuation cam 12 rotate in the opposite direction. The actuation cam 12 is driven by a pin 10 that abuts one end of the window 14. As the actuation cam 12 rotates, the actuation lever 15 partially disengages with the indentation 13 on the cam surface of the actuation cam 12 and the actuation lever 15 moves up the ramp 13a away from the step 13b. The actuation lever 15 pivots about a pivot point 16 as it slides up the ramp 13a causing the actuation lever 15 to lose contact with the vehicle acceleration sensor lever 7. Thus the bias of the vehicle acceleration sensor lever 7 looses contact with the ratchet wheel 19.

FIG. 11 shows the seat belt retractor returned to Emergency Locking Retractor (ELR) mode. The actuation lever 15 has fully disengaged from the indentation 13 and is not in contact with the vehicle acceleration sensor lever 7 which is now fully disengaged from the ratchet wheel 19 and can move freely about the pivot point 7b so that the seat belt webbing 21 may be wound on to or pulled from the spool 1 because the relevant parts can move in both directions.

A particular advantage of this seat belt retractor arrangement is that the vehicle acceleration sensor lever 7 performs two functions: it locks the retractor when the vehicle acceleration sensor 6 detects accelerations/decelerations greater than a predetermined magnitude and it also prevents rotation of the spool 1 in the seat belt webbing 21 pay-out direction when operating in Automatic Locking Retractor (ALR) mode. Therefore a separate component is not required to perform one of these functions, leading to a reduction in the number of parts required. Also, the size, position and orientation of the actuation lever 15 in relation to the vehicle acceleration sensor lever 7 reduces the size of the retractor. This arrangement can lead to significant savings in unit production costs.

It should be understood that variations and modifications of the present invention can be made without departing from the scope thereof. It is also to be understood that the present invention is not to be limited by the specific embodiments disclosed herein but only in accordance with the appended claims when read in light of the foregoing specification.

I claim:

1. A seat belt retractor comprising a spool for carrying seat belt webbing rotatably mounted about a longitudinal axis and biased in a seat belt webbing rewinding direction, a toothed ratchet wheel mounted to rotate with the spool, a sensor for detecting an emergency condition, a vehicle acceleration sensor lever responsive to the sensor to engage the ratchet wheel in the event of an emergency condition, means for locking the spool against pay-out of seat belt webbing in response to the vehicle acceleration sensor lever engaging the ratchet wheel, the retractor being adapted to operate in a first, emergency locking mode in which the spool is not locked and can rotate to pay-out and to rewind seat belt webbing and in a second, automatic locking mode in which the spool is locked against pay-out of the seat belt webbing and means for switching between the first mode and the second mode, wherein the switching means comprises a cam connected to the spool via a step-down gearing arrangement and having a cam surface and an actuating lever having a cam follower resiliently biased against the cam surface, the actuating lever being pivotally mounted and movable from a first position in which the actuating lever does not actuate the vehicle acceleration sensor lever and the retractor is in the first mode, against the action of the resilient bias to a second position in which it actuates the vehicle acceleration sensor lever and the retractor is in the second mode, the vehicle acceleration sensor lever and the means for switching between the first mode and the second mode are both located between the spool and the sensor for detecting an emergency condition.

2. The seat belt retractor according to claim 1 wherein the vehicle acceleration sensor lever is the only lever arranged to engage the ratchet wheel.

3. The seat belt retractor according to claim 2 wherein the cam surface has an indentation and a step therein substantially radial to the cam surface for engaging the actuation lever during switching between the first mode and the second mode.

4. The seat belt retractor according to claim 3 wherein the cam follower has a smaller surface contract area with the cam surface when not engaged in the indentation and a larger surface area with the cam surface when engaged with the indentation.

5. The seat belt retractor according to claim 4 wherein a portion of the vehicle acceleration sensor lever is arranged to co-operate with the sensor and another portion of the vehicle acceleration sensor lever is arranged for engagement with the ratchet wheel and wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

6. The seat belt retractor according to claim 4 wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

7. The seat belt retractor according to claim 3 wherein a portion of the vehicle acceleration sensor lever is arranged to co-operate with the sensor and another portion of the vehicle acceleration sensor lever is arranged for engagement with the ratchet wheel and wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

8. The seat belt retractor according to claim 3 wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

9. The seat belt retractor according to claim 1 wherein the cam surface has an indentation and a step therein substantially radial to the cam surface for engaging the actuation lever during switching between the first mode and the second mode.

10. The seat belt retractor according to claim 9 wherein the cam follower has a smaller surface contract area with the cam surface when not engaged in the indentation and a larger surface area with the cam surface when engaged with the indentation.

11. The seat belt retractor according to claim 10 wherein a portion of the vehicle acceleration sensor lever is arranged to co-operate with the sensor and another portion of the vehicle acceleration sensor lever is arranged for engagement with the ratchet wheel and wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

12. The seat belt retractor according to claim 10 wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

13. The seat belt retractor according to claim 9 wherein a portion of the vehicle acceleration sensor lever is arranged to co-operate with the sensor and another portion of the vehicle acceleration sensor lever is arranged for engagement with the ratchet wheel and wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

14. The seat belt retractor according to claim 9 wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

15. The seat belt retractor according to claim 1 wherein the cam follower has a smaller surface contract area with the cam surface when not engaged in the indentation and a larger surface area with the cam surface when engaged with the indentation.

16. The seat belt retractor according to claim 1 wherein the vehicle acceleration sensor lever is arranged to pivot about a pivot point on a mounting member when the retractor is functioning in the first mode of operation.

17. The seat belt retractor according to claim 1 wherein a portion of the vehicle acceleration sensor lever is arranged to co-operate with the sensor and another portion of the vehicle acceleration sensor lever is arranged for engagement with the ratchet wheel and wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

18. The seat belt retractor according to claim 1 wherein the actuating lever is pivotally mounted above the vehicle acceleration sensor lever such that the actuating lever engages the vehicle acceleration sensor lever between said portions of the vehicle acceleration sensor lever to cause the vehicle acceleration sensor lever to pivot and engage the ratchet wheel.

* * * * *